Patented July 7, 1925.

1,544,811

UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

METHOD OF TREATING CELLULOSE NITRATES.

No Drawing. Original application filed November 21, 1921, Serial No. 516,897. Divided and this application filed February 27, 1922. Serial No. 539,715.

*To all whom it may concern:*

Be it known that I, JOHN COLLINS CLANCY, a subject of the King of Great Britain, residing at Providence, in the county of Providence and State of Rhode Island, have invented certain new and useful Improvements in Methods of Treating Cellulose Nitrates, of which the following is a specification.

This invention relates to an improved method of treating cellulose nitrates, and has to do more particularly with the use of an improved solvent for cellulose esters and the formation through the instrumentality of said solvent of a cellulose compound possessing certain new and useful properties which adapt it for wide use in the arts.

While it is known that certain cellulose esters, such for example, as certain of the acetates and nitrates, are soluble in substances such as acetone, amyl acetate, tetrachlorethane and carbon bisulfid, the use of certain of these substances is open to objections such as, the cost of the solvents, their inflammability, their poisonous nature and the difficulty experienced in removing the solvents from the final product. Moreover, by no means all of the cellulose esters are soluble in any of the solvents named, and each of the above solvents is adapted for use with only an extremely limited number of the cellulose esters included in the classes mentioned above.

One object of the present invention is to provide a novel solvent for cellulose esters, including particularly the acetates and nitrates, which is capable of more general use than those heretofore employed, which is not inflammable and which is capable of being readily separated from the resultant product.

Other objects and advantages of the invention relate to certain novel steps and combinations of steps involved in the carrying out of the invention as well as certain methods of treatment which will be more fully set forth in the detailed description to follow.

I have found that liquid sulfur dioxid serves as an excellent solvent for the cellulose esters generally, being capable of dissolving a considerably greater number of the acetates and nitrates of cellulose than any of the solvents heretofore generally employed, while the nature of the sulfur dioxid is such as to permit its being readily substantially removed from the cellulose compound by evaporation. By the use of liquid sulfur dioxid cellulose acetates and nitrates can be dissolved so as to continue to possess the structural aggregates of the original cellulose acetates and nitrates, that is, without being degraded, thus forming a cellulose compound capable of being given any desired shape while at the same time retaining the strength inherent in the original cellulose structure. I propose to place the cellulose esters, such as cellulose acetates or nitrates, in a bath of sulfur dioxid, whereupon I find that they immediately dissolve to form a clear solution which can be readily freed from air bubbles or entrained gases, and the solution thus formed may be caused to flow upon an endless belt, forced through minute apertures or placed in moulds and the sulfur dioxid freed from the mass by evaporation to form a transparent or translucent film, thread or other desired shape possessing a high degree of strength and capable of use for a variety of purposes.

Since sulfur dioxid is liquefied only at comparatively low temperatures unless subjected to pressure in excess of that normally exerted by the atmosphere, I prefer to dissolve the cellulose esters in the sulfur dioxid under a pressure somewhat greater than that normally exerted by the atmosphere and sufficient to maintain the sulfur dioxid in a liquid state, thus making it unnecessary to employ such low temperatures as would be inconvenient in practical operation. The sulfur dioxid is then removed from the resulting product by lowering the pressure and if necessary raising the temperature to hasten the evaporation of the sulfur dioxid from the mass. However, the liquid sulfur dioxid may be employed under atmospheric pressure by sufficiently lowering the temperature and the cellulose esters dissolved therein, whereupon the sulfur dioxid may be substantially removed from the mass by raising the temperature or if desired by subjecting the mass to a pressure somewhat lower than that normally exerted by the atmosphere, or increased temperature and reduced pressure may be used together in removing the sulfur dioxid from the resulting product.

The product obtained by directly dissolving the cellulose esters in liquid sulfur dioxid under pressure and evaporating off the sulfur dioxid in a closed system where no moisture is present, is considerably tougher, more elastic and more clear than that obtained by evaporating off the sulfur dioxid in the open air.

The sulfur dioxid employed is preferably substantially pure and free from moisture or other contaminants, and may of course be recovered if desired when removed from the resultant product.

Having found that the nitrates of cellulose as well as the acetates are soluble in liquid sulfur dioxid as above described, I may utilize liquid sulfur dioxid for dissolving either cellulose acetates or cellulose nitrates separately or may mix cellulose acetates and cellulose nitrates in any desired proportion and dissolve the mixture in sulfur dioxid to obtain a cellulose composition possessing certain desired qualities when the solvent has been removed.

The product resulting from the treatment of cellulose esters as above described possesses certain qualities which admirably adapt it for use in the arts by reason of the readiness with which the solvent may be freed from the resultant product as well as by reason of the fact that certain of the cellulose esters not generally soluble in solvents heretofore commonly employed are soluble in the sulfur dioxide thus imparting to the resultant product a structural strength not heretofore readily obtainable.

I have also discovered that while liquid sulfur dioxide dissolves the cellulose esters of itself without the addition of any other solvent, it also possesses the particularly novel function of rendering cellulose esters soluble in liquids which are not otherwise solvents therefor. Among such liquids are carbon-tetrachloride, pentachlorethane, dichlorethane, gasoline, benzine, turpentine and chlorinated oils, such for example as chlorinated benzine, chlorinated naphthalene, chlorinated kerosene, chlorinated heavy mineral oils and the like.

In effecting the solution of the cellulose esters in the above substances I first dissolve the esters in liquid sulfur dioxide and then add one or more of the liquids enumerated above to the solution and evaporate off the sulfur dioxide leaving the cellulose ester which remains in solution in the added menstruum.

This operation is preferably carried out in a closed system and under super atmospheric pressure, until the solution of cellulose ester in liquid sulfur dioxid is transferred into the other menstruum, when the evaporation of the sulfur dioxid from the mixture may be effected in the open air or under reduced pressure, that is, sub-atmospheric pressure.

This feature of the invention is of great importance since it makes it possible to prepare a solution of cellulose esters in liquids not otherwise solvents for the same, and liquids of different boiling points may be utilized.

As illustrations of important commercial applications of the invention the dissolved esters may be utilized in the manufacture of photographic films, artificial silk and the like, while the solutions formed by the substitution of the liquids enumerated for liquid sulfur dioxid may be employed for a variety of purposes such as forming transparent or translucent coatings and films upon surfaces.

This case is a division of my pending application, Serial No. 516,897, filed November 21, 1921, for a method of treating cellulose and the formation of cellulose compounds.

What I claim is:

1. The process which comprises dissolving cellulose nitrate in liquid sulfur dioxide.

2. The process of treating cellulose nitrate with liquid sulfur dioxid to dissolve the same, and then substantially removing the sulfur dioxid from the resultant compound.

3. The process which comprises treating cellulose nitrate with liquid sulfur dioxid to dissolve the same and then substantially removing the sulfur dioxid therefrom under a pressure less than that under which the solution was effected.

4. The process of treating cellulose esters which comprises subjecting cellulose nitrate to the action of liquid sulfur dioxid with exclusion of moisture.

5. The process of treating cellulose esters which comprises subjecting cellulose nitrate to the action of liquid sulfur dioxid under super-atmospheric pressure.

6. The process of treating cellulose esters which comprises subjecting cellulose nitrate to the action of liquid sulfur dioxid under super-atmospheric pressure, and then substantially removing the sulfur dioxid.

7. The process of producing a cellulose compound which comprises subjecting cellulose nitrate to the action of liquid sulfur dioxid with exclusion of moisture, and then substantially removing the sulfur dioxid from the mass.

8. The process of treating cellulose nitrate with liquid sulfur dioxid to dissolve the cellulose nitrate, and then substantially removing the sulfur dioxid with exclusion of moisture.

9. The process which comprises, treating cellulose nitrate with liquid sulfur dioxid under super-atmospheric pressure and then substantially removing the sulfur dioxid therefrom with exclusion of moisture.

10. The process which comprises treating cellulose nitrate with liquid sulfur dioxid and then substantially removing the sulfur dioxid from the mass under a pressure less than that under which the treatment was effected and with exclusion of moisture.

11. The process of treating cellulose nitrate which comprises dissolving the cellulose nitrate in liquid sulfur dioxid and then transferring the dissolved material into a menstruum in which the cellulose nitrate is not initially soluble.

12. The process of treating cellulose nitrates which comprises dissolving the cellulose nitrate in liquid sulfur dioxid, then transferring the dissolved material into a menstruum in which the cellulose nitrate is not initially soluble, and subsequently substantially removing the sulfur dioxid.

In testimony whereof I have affixed my signature.

JOHN COLLINS CLANCY.